US010878238B2

(12) United States Patent
Abe (10) Patent No.: US 10,878,238 B2
(45) Date of Patent: Dec. 29, 2020

(54) BIOMETRIC AUTHENTICATION DEVICE, BIOMETRIC AUTHENTICATION METHOD AND COMPUTER-READABLE NON-TRANSITORY MEDIUM

(71) Applicant: FUJITSU LIMITED, Kawasaki (JP)

(72) Inventor: Narishige Abe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 15/398,792

(22) Filed: Jan. 5, 2017

(65) Prior Publication Data

US 2017/0206411 A1    Jul. 20, 2017

(30) Foreign Application Priority Data

Jan. 15, 2016   (JP) .................................. 2016-006593

(51) Int. Cl.
*G06K 9/00* (2006.01)

(52) U.S. Cl.
CPC ....... *G06K 9/00617* (2013.01); *G06K 9/0061* (2013.01); *G06K 9/00899* (2013.01); *G06K 9/00926* (2013.01)

(58) Field of Classification Search
CPC ............. G06K 9/0061; G06K 9/00617; G06K 9/00926; G06K 9/00899
See application file for complete search history.

(56) References Cited

U.S. PATENT DOCUMENTS

| | | | |
|---|---|---|---|
| 9,119,562 B2 * | 9/2015 | Naba | A61B 3/102 |
| 10,049,261 B2 * | 8/2018 | Tai | G06K 9/00288 |
| 10,282,620 B2 * | 5/2019 | Noh | G06K 9/00718 |
| 10,509,950 B2 * | 12/2019 | Norimatsu | G07C 9/253 |
| 10,529,047 B2 * | 1/2020 | Beaudet | G07C 9/37 |
| 10,547,610 B1 * | 1/2020 | Faibish | G06F 21/32 |
| 2003/0091215 A1 * | 5/2003 | Lauper | G09K 9/00597 |
| | | | 382/117 |
| 2006/0088193 A1 * | 4/2006 | Muller | G06K 9/00597 |
| | | | 382/117 |

(Continued)

FOREIGN PATENT DOCUMENTS

| | | |
|---|---|---|
| JP | 2003-533801 | 11/2003 |
| JP | 2007-132994 | 5/2007 |

(Continued)

OTHER PUBLICATIONS

Japanese Office Action dated Aug. 6, 2019 for corresponding Japanese Patent Application No. 2016-006593, with English Translation, 6 pages.

(Continued)

*Primary Examiner* — Mia M Thomas
(74) *Attorney, Agent, or Firm* — Fujitsu Patent Center (57) ABSTRACT

A biometric authentication device includes: an acquisition device configured to acquire eye information of a user; a memory; and a processor coupled to the memory and the processor configured to: extract a first eye feature based on recognition characteristic from the eye information; extract a second eye feature based on eye movement characteristic from the eye information; and match a first eye feature enrolled in advance with the first eye feature extracted by the first extractor, and to match a second eye feature enrolled in advance with the second eye feature extracted by the second extractor.

14 Claims, 12 Drawing Sheets

(56) References Cited

U.S. PATENT DOCUMENTS

| | | | | |
|---|---|---|---|---|
| 2007/0016790 | A1* | 1/2007 | Brundage | G06T 1/0071 713/176 |
| 2010/0098300 | A1* | 4/2010 | Otto | G06K 9/00617 382/117 |
| 2011/0176716 | A1* | 7/2011 | Kim | G06T 3/0075 382/131 |
| 2014/0126782 | A1* | 5/2014 | Takai | G06K 9/0061 382/116 |
| 2017/0112372 | A1* | 4/2017 | Chakravorty | G06K 9/0061 |
| 2017/0119247 | A1* | 5/2017 | Walsh | A61B 3/102 |
| 2017/0231492 | A1* | 8/2017 | Sudo | A61B 3/0025 351/206 |
| 2017/0270653 | A1* | 9/2017 | Garnavi | G06N 20/20 |
| 2017/0273557 | A1* | 9/2017 | Nakazawa | G06T 7/62 |
| 2017/0273558 | A1* | 9/2017 | Tamura | A61B 3/13 |

FOREIGN PATENT DOCUMENTS

| | | |
|---|---|---|
| JP | 2007-141002 | 6/2007 |
| JP | 2008-099716 | 5/2008 |
| JP | 2009-502382 | 1/2009 |
| JP | 2014-092940 | 5/2014 |
| WO | 01/88857 | 11/2001 |
| WO | 2007/017207 | 2/2007 |

OTHER PUBLICATIONS

Abe, Narishige et al.,"Eye Movement, A Study for Eye Movement Authentication Technique using Sliding Windows", 2015 Cryptography and Information Security Symposium SCIS2015 [CD-ROM], Jan. 2015, pp. 1-6, cited in JPOA dated Aug. 6, 2019 for corresponding Japanese Patent Application No. 2016-006593.

* cited by examiner

BIOMETRIC AUTHENTICATION DEVICE, BIOMETRIC AUTHENTICATION METHOD AND COMPUTER-READABLE NON-TRANSITORY MEDIUM

CROSS-REFERENCE TO RELATED APPLICATION

This application is based upon and claims the benefit of priority of the prior Japanese Patent Application No. 2016-006593, filed on Jan. 15, 2016, the entire contents of which are incorporated herein by reference.

FIELD

A certain aspect of embodiments described herein relates to a biometric authentication device, a biometric authentication method and a computer-readable non-transitory medium.

BACKGROUND

There is an authentication using an eyeball movement. For example, in the authentication, it is determined whether letters or numbers shown on a screen are gazed in a predetermined order or not (for example, see Japanese Patent Application Publication No. 2007-141002).

SUMMARY

According to an aspect of the present invention, there is provided a biometric authentication device including: an acquisition device configured to acquire eye information of a user; a memory; and a processor coupled to the memory and the processor configured to: extract a first eye feature based on recognition characteristic from the eye information; extract a second eye feature based on eye movement characteristic from the eye information; and match a first eye feature enrolled in advance with the first eye feature extracted by the first extractor, and to match a second eye feature enrolled in advance with the second eye feature extracted by the second extractor.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The following is a description of embodiments, with reference to the accompanying drawings.

First Embodiment

Figure 1A:
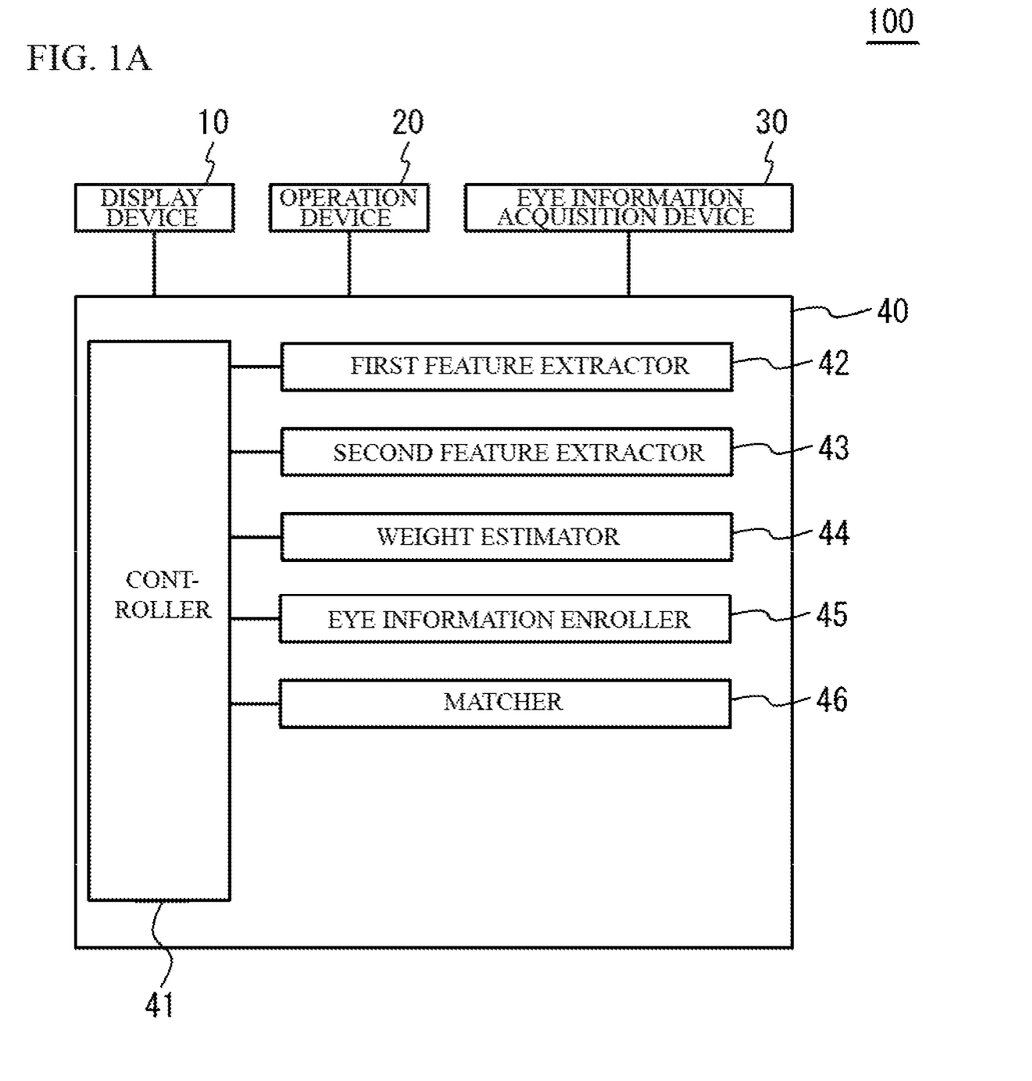
FIG. 1A illustrates a block diagram of an overall structure of a biometric authentication device in accordance with a first embodiment.

FIG. 1A illustrates a block diagram of an overall structure of a biometric authentication device 100 in accordance with a first embodiment. As illustrated in FIG. 1A, the biometric authentication device 100 has a display device 10, an operation device 20, an eye information acquisition device 30, a process unit 40 and so on. The process unit 40 acts as a controller 41, a first feature extractor 42, a second feature extractor 43, a weight estimator 44, an eye information enroller 45 and a matcher 46 and so on.

The display device 10 is a display device such as a liquid crystal display or an electro luminescence panel and indicates process results and so on. The operation device 20 is a device to which a user inputs an instruction for operating the biometric authentication device 100. The operation device 20 is such as a keyboard, a mouse or a touch panel. The eye information acquisition device 30 is a device that acquires a line of an eye of a user. The eye information acquisition device 30 is an image capture device such as a camera. The process unit 40 is a device that performs an enrollment process and an authentication process in accordance with a signal from the operation device 20 and the eye information acquisition device 30.

Figure 1B:
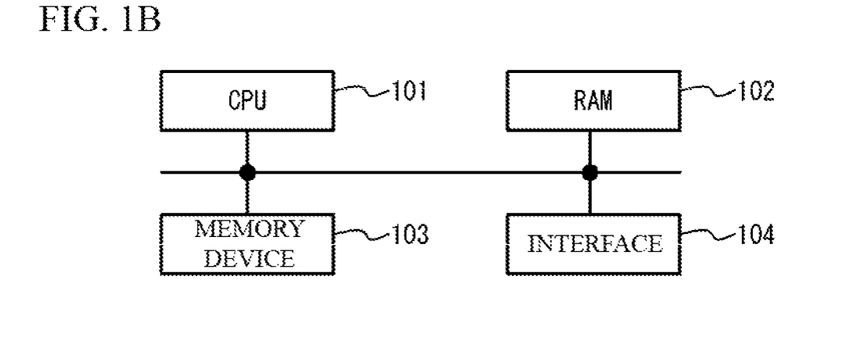
FIG. 1B illustrates a hardware structure of the process unit.

FIG. 1B illustrates a hardware structure of the process unit 40. As illustrated in FIG. 1B, the process unit 40 has a CPU 101, a RAM (Random Access Memory) 102, a memory device 103, an interface 104 and so on. These components are coupled to each other with a bus or the like.

The CPU 101 is a central processing unit. The CPU 101 includes one or more core. The RAM 102 is a volatile memory temporally storing a program executed by the CPU 101, a data processed by the CPU 101, and so on.

The memory device 103 is a nonvolatile memory device. The memory device 103 may be a SSD (Solid State Drive) such as a ROM (Read Only Memory) or a flash memory, or a hard disk driven by a hard disk drive. The memory device 103 stores a biometric authentication program. The interface 104 is an interface between the process unit 40 and other components.

Figure 3:
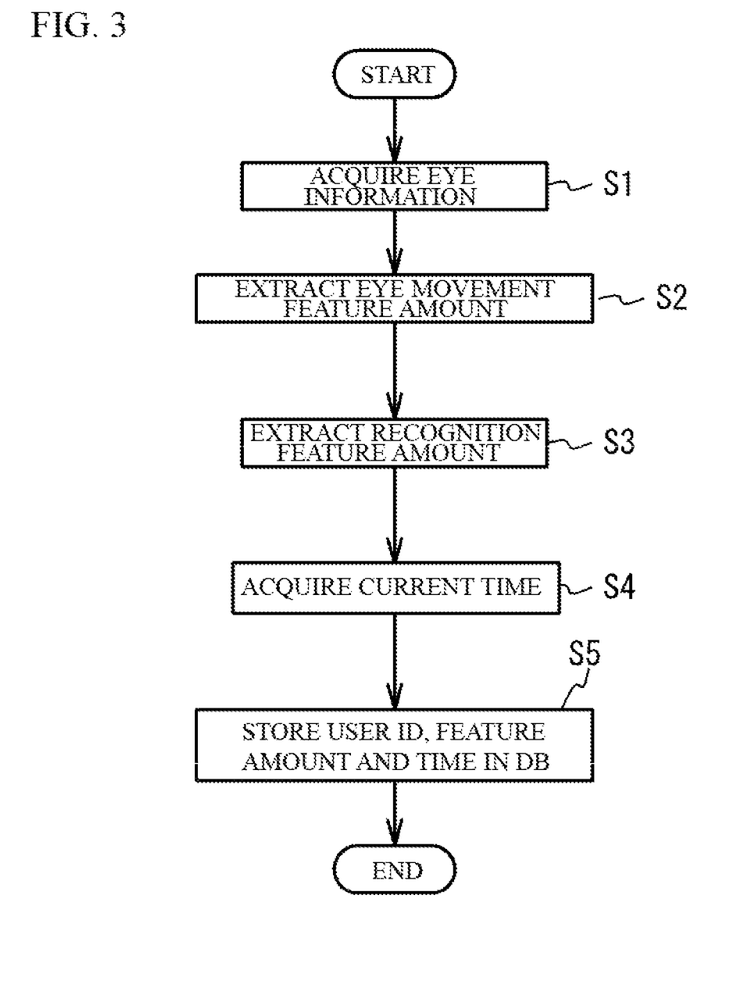
FIG. 3 illustrates a flowchart of an enrollment process.

A biometric authentication program stored in the memory device 103 is developed to the RAM 102. The CPU 101 executes the biometric authentication program developed to the RAM 102. Thus, each part of the process unit 40 is achieved. FIG. 3 illustrates a functional block of the process unit 40 in the following enrollment process and the following authentication process.

Figure 2:
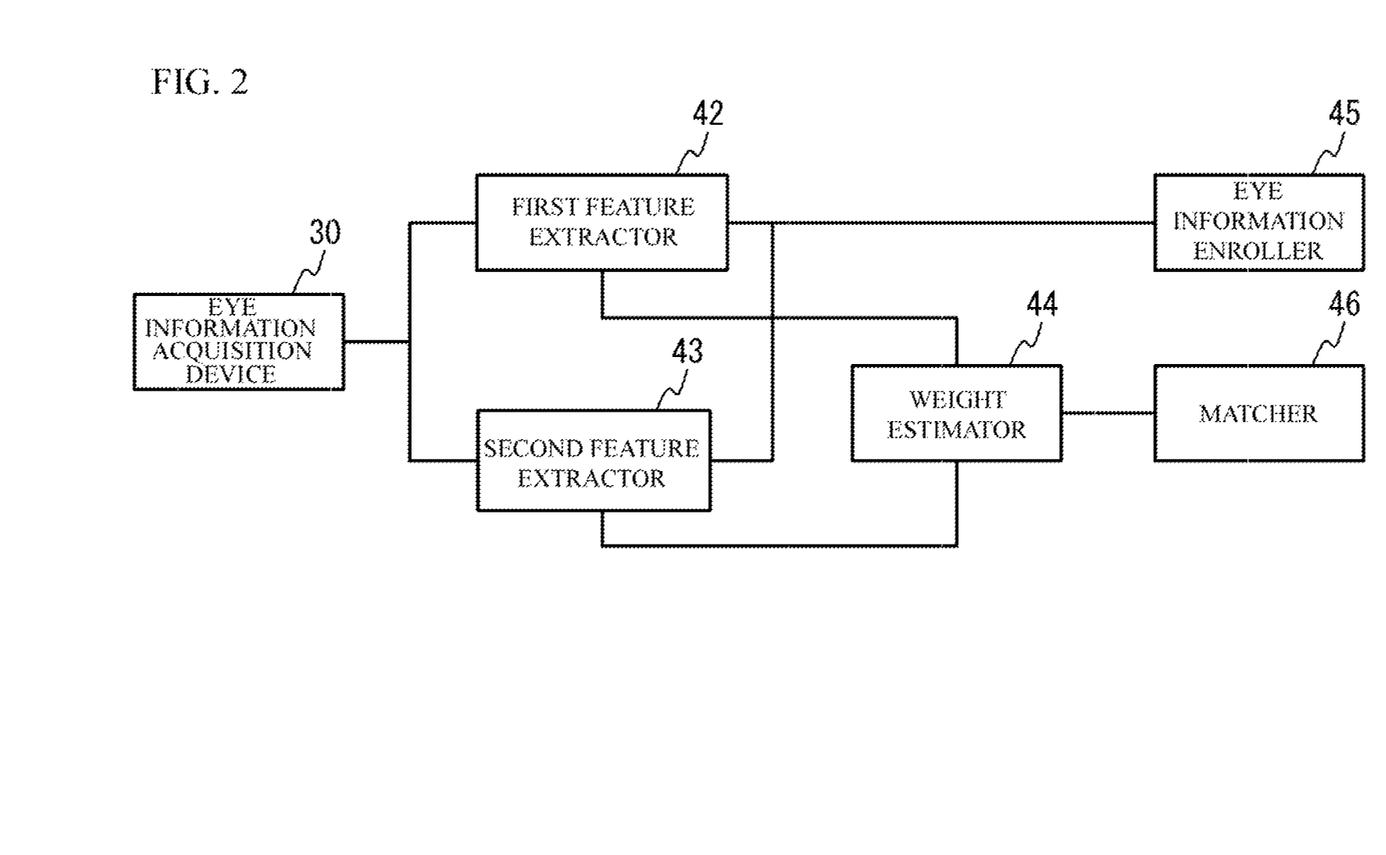
FIG. 2 illustrates a function block diagram of a process unit of an enrollment process and an authentication process.

(Enrollment Process) A description will be given of the enrollment process based on FIG. 2 and FIG. 3. FIG. 3 illustrates a flowchart of the enrollment process. When the enrollment process is performed, the eye information acquisition device 30 acquires eye information of a user as enrollment eye information (Step S1). In concrete, the eye information acquisition device 30 acquires the enrollment eye information with use of a corneal reflection of an eyeball of a user within a predetermined time range. Alternately, the eye information acquisition device 30 measures a rotation angle of an eyeball by reading a signal of a muscle fiber around the eyeball of a user within a predetermined time range, and acquires enrollment eye information by calculating a coordinate of a point of gaze. The enrollment eye information is acquired as a coordinate (x(t), y(t)) which a line of eye reaches with respect to a predetermined xy plane. "(t)" indicates an elapsed time.

Next, the first feature extractor 42 extracts an eyeball movement feature amount from the enrollment eye information acquired by the eye information acquisition device 30 (Step S2). The eyeball movement feature amount is a feature amount based on a movement performance of an eyeball. In concrete, the eyeball movement feature amount is information relating to an oscillation of an eyeball during gazing an object, a maximum rotation speed of each movement direction of an eyeball, or the like. For example, when the oscillation appearing in the enrollment eye information is converted into a feature amount, cepstrum information is extracted from the enrollment eye information.

A discrete Fourier transform is performed with respect to the acquired enrollment eye information (x(t), y(t)) in accordance with the following formulas (1) and (2) in order to extract the cepstrum. "N" indicates the number of data elements.

$$F_x(n) = \sum_{i=0}^{N-1} x(t)\left(-2\pi i \frac{nt}{N}\right)$$ [Formula 1]

$$F_y(n) = \sum_{i=0}^{N-1} y(t)\left(-2\pi i \frac{nt}{N}\right)$$ [Formula 2]

Power spectrum is calculated in accordance with the following formulas (3) and (4).

$$P_x(n) = \log|F_x(n)|$$ [Formula 3]

$$P_x(n) = \log|F_y(n)|$$ [Formula 4]

Further, spectrum information is calculated with respect to the calculated power spectrum with use of a discrete cosine transform in accordance with the following formulas (5) and (6).

$$C_x(n) = \sum_{i=0}^{N-1} P_x(t)\cos\left(\frac{\pi}{N}\left(n+\frac{1}{2}\right)t\right)$$ [Formula 5]

$$C_y(n) = \sum_{i=0}^{N-1} P_y(t)\cos\left(\frac{\pi}{N}\left(n+\frac{1}{2}\right)t\right)$$ [Formula 6]

First K numbers of coefficients of a low frequency is expressed by a vector column and is treated as a feature amount.

Next, the second feature extractor 43 extracts a recognition feature amount from the enrollment eye information acquired by the eye information acquisition device 30 (Step S3). The recognition feature amount is a feature amount caused by recognition of an object. In concrete, the recognition feature amount is such as an average or a dispersion of a continuous gazing time during gazing, or an average or a dispersion of a movement speed during movement of gazing point. These statistical values are normalized and expressed as a simple vector column. A superior main component acquired by performing a main component analysis with respect to the vector column may be treated as a feature amount.

Next, the controller 41 acquires a current time (Step S4). Next, the controller 41 relates the eyeball movement feature amount extracted in Step S2, the recognition feature amount extracted in Step S3 and the current time acquired in Step S4 with a user ID and enrolls the eyeball movement feature amount, the recognition feature amount and the current time in the eye information enroller 45 (Step S5). With the processes, the enrollment process is finished.

Figure 4:
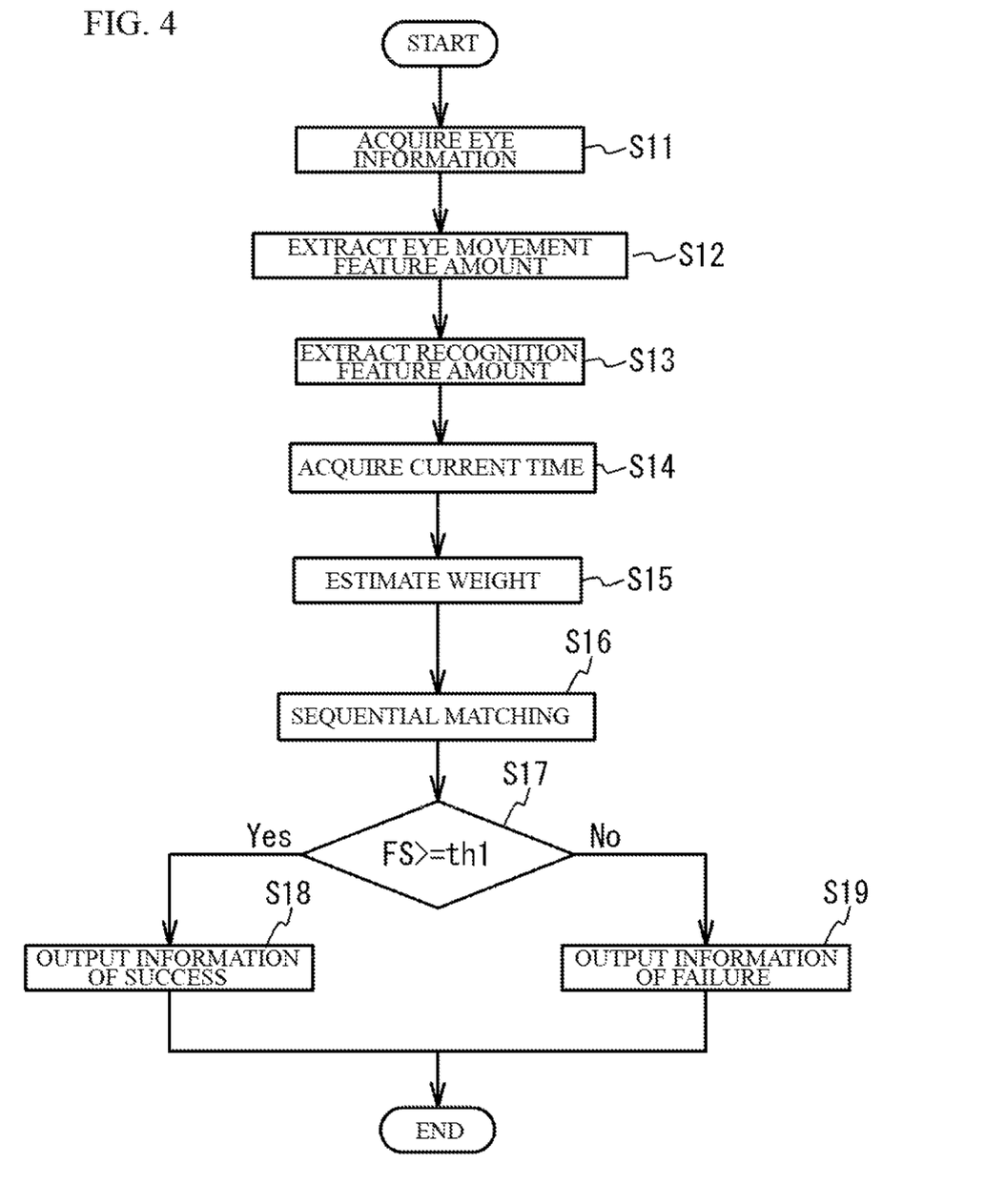
FIG. 4 illustrates a flowchart of an authentication process.
Figure 5A:
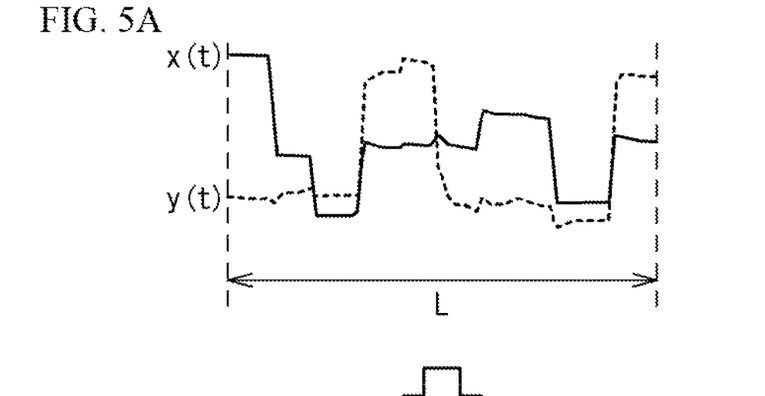
FIG. 5A to FIG. 5C illustrate a sequential matching process of an authentication process.
Figure 5B:
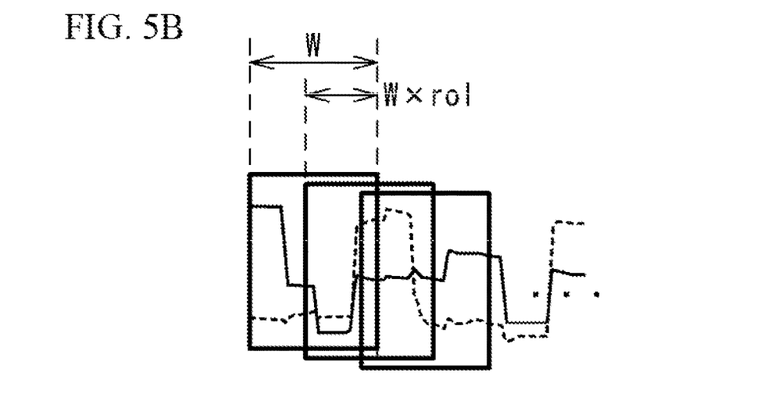
Figure 5C:
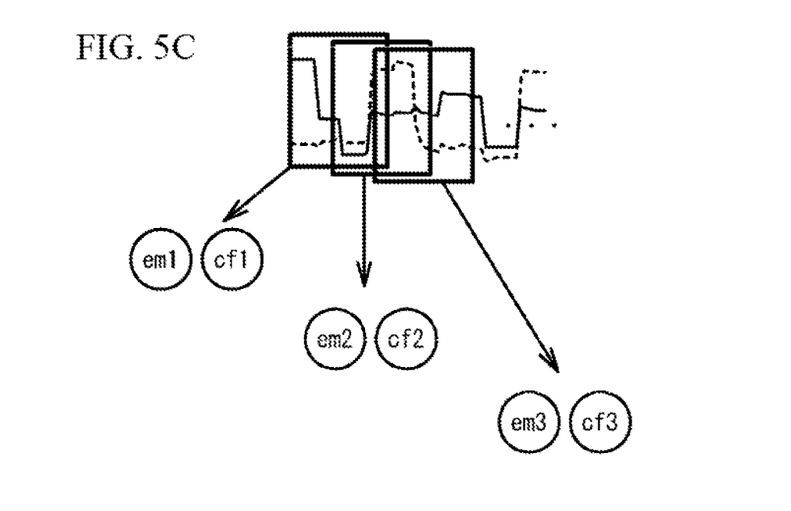
Figure 6:
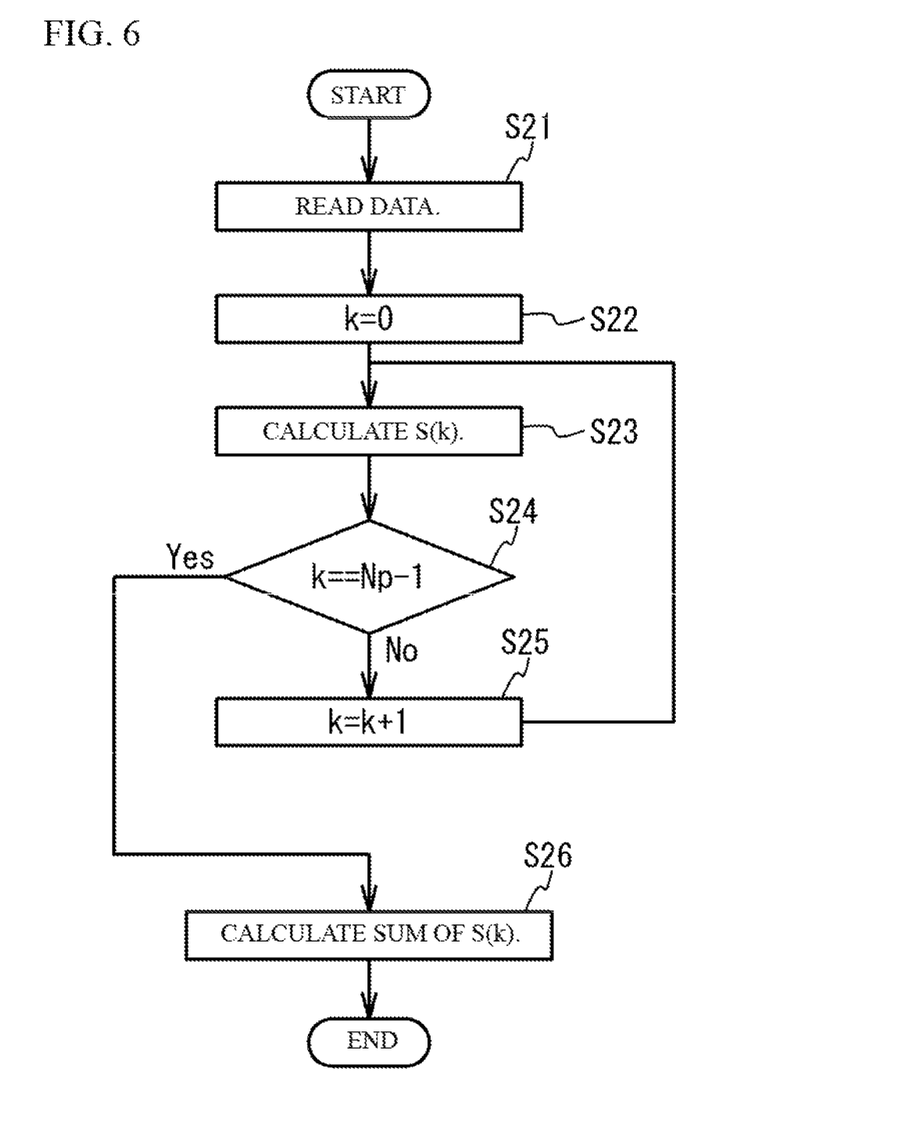
FIG. 6 illustrates a flowchart of a sequential matching process of an authentication process.

(Authentication Process) A description will be given of an authentication process based on FIG. 2 and FIG. 4 to FIG. 6. The authentication process is performed when a user requests login after the enrollment process. FIG. 4 illustrates a flowchart of the authentication process. FIG. 5A to FIG. 5C illustrate a sequential matching process of the authentication process. FIG. 6 illustrates a flowchart of the sequential matching process of the authentication process.

As illustrated in FIG. 4, the eye information acquisition device 30 acquires eye information of a user as eye information for matching within a predetermined time range (Step S11). The time range of this case is the same as a time range during acquiring enrollment eye information by the eye information acquisition device 30. Next, the first feature extractor 42 extracts eye movement feature amount from the eye information for matching acquired by the eye information acquisition device 30 (Step S12). Next, the second feature extractor 43 extracts a recognition feature amount from the eye information for matching acquired by the eye information acquisition device 30 (Step S13). Next, the controller 41 acquires a current time (Step S14).

Next, the weight estimator 44 estimates a weight in accordance with the current time acquired in Step S14 (Step S15). The weight in this case is a weight of a recognition feature amount in a case of calculating a similarity with use of the recognition feature amount and the eye movement feature amount. In concrete, the weight estimator 44 estimates the weight in accordance with the following formula (7) based on a time elapsed from an enrollment date of the enrollment eye information.

$$W_f = \frac{\alpha}{ET+1}$$ [Formula 7]

Next, the matcher 46 performs a sequential matching process (Step S16). FIG. 5A illustrates the eye information for matching acquired in Step S11. As illustrated in FIG. 5A, the eye information for matching is acquired as an x coordinate (x(t)) and a y coordinate (y(t)) with respect to the elapsed time t.

Next, as illustrated in FIG. 5B, the matcher 46 divides the eye information for matching into local data windows and acquires the recognition feature amount extracted by the first feature extractor 42 and the eye movement feature amount extracted by the second feature extractor 43 from each data window. The matcher 46 divides the eye information for matching into data patches pi having a data length W. Here, "L" is a data length (≠0) of x(t) and y(t). "$r_{ol}$" is an overlapping ratio (0≤$r_{ol}$<1) between each data window. In this case, the number Np of the data patches is expressed by the following formula (8).

$$N_p = \left\lceil \frac{L}{W(1-r_{ol})} \right\rceil - 1 \quad \text{[Formula 8]}$$

Next, the matcher 46 acquires the recognition feature amount and the eye movement feature amount from the data patch pi. The recognition feature amount acquired from the enrollment eye information is cft(i). The eye movement feature amount acquired from the enrollment eye information is emt(j). The eye movement feature amount acquired from the eye information for matching is emv(j). The matcher 46 calculates a similarity FS between the enrollment eye information and the eye information for matching by using these feature amounts in accordance with the following formulas (9) and (10). In the following formula (9), $L1_{norm}$ (,) is a calculation result of the L1 norm between vectors. The following formulas (9) and (10) are formulas for calculating total sum of similarities between the recognition feature amount and the eye movement feature amount of each data patch of the eye information for matching and the recognition feature amount and the eye movement feature amount of each data patch of the enrollment eye information. "$N_s$" is a coefficient for normalizing the similarities.

$$S(j) = 1 - \frac{[\min(L1_{norm}(cft(i), cfv(j))) \mid \forall i] + W_f \cdot [\min(L1_{norm}(emt(i), emv(j))) \mid \forall i]}{N_s} \quad \text{[Formula 9]}$$

$$FS = \sum_{k=0}^{N_p-1} S(k) \quad \text{[Formula 10]}$$

Next, a description will be given of the above-mentioned sequential matching process along a flowchart based on FIG. 6. The matcher 46 acquires the eye movement feature amount and the recognition feature amount of the enrollment eye information enrolled in the eye information enroller 45 (Step S21). Next, the matcher 46 substitutes zero into a variable number k (Step S22). Next, the matcher 46 calculates S(k) in accordance with the formula (9) (Step S23). Next, the matcher 46 determines whether the variable number k is equal to the number $N_p$ of the data patches (Step S24). When it is determined as "No" in Step S24, the matcher 46 adds one to the variable number k (Step S25). Next, Step S23 is executed again. When it is determined as "Yes" in Step S24, the matcher 46 calculates a total of S(k) as the similarity FS in accordance with the formula (10) (Step S26). After that, the execution of the flowchart is terminated.

As illustrated in FIG. 4, after Step S16, the matcher 46 determines whether the similarity FS is equal to or more than a threshold th1 (Step S17). When it is determined as "Yes" in Step S17, the matcher 46 outputs information of success of authentication (Step S18). When it is determined as "No" in Step S17, the matcher 46 outputs information of failure of authentication (Step S19). After Step S18 or Step S19, the execution of the flowchart is terminated.

In the embodiment, the authentication is performed by using both of the recognition feature amount and the eye movement feature amount. In this case, the authentication is performed by using the eye movement feature amount in addition to the recognition feature amount of a case where a user is recognizing something with his eyes. Thus, it is possible to perform the authentication without asking for a specific task from a user. It is therefore possible to reduce burden of the user. For example, when the authentication is succeeded and login is achieved, it is possible to continuously perform an authentication without asking for a specific task from a user.

As described with the above-mentioned formula (7), a weight may be set between the similarity between the recognition feature amount of the enrollment eye information and the recognition feature amount of the eye information for matching and the similarity between the eye movement feature amount of the enrollment eye information and the eye movement feature amount of the eye information for matching. For example, the eye movement feature amount tends to change with elapsing of time. It is therefore preferable that a weight of the similarity between the eye movement feature amount of the enrollment eye information and the eye movement feature amount of the eye information for matching is reduced with elapsing of time. The weight of the similarity between the eye movement feature amount of the enrollment eye information and the eye movement feature amount of the eye information for matching may be reduced in accordance with a time band of a day.

Second Embodiment

Figure 7A:
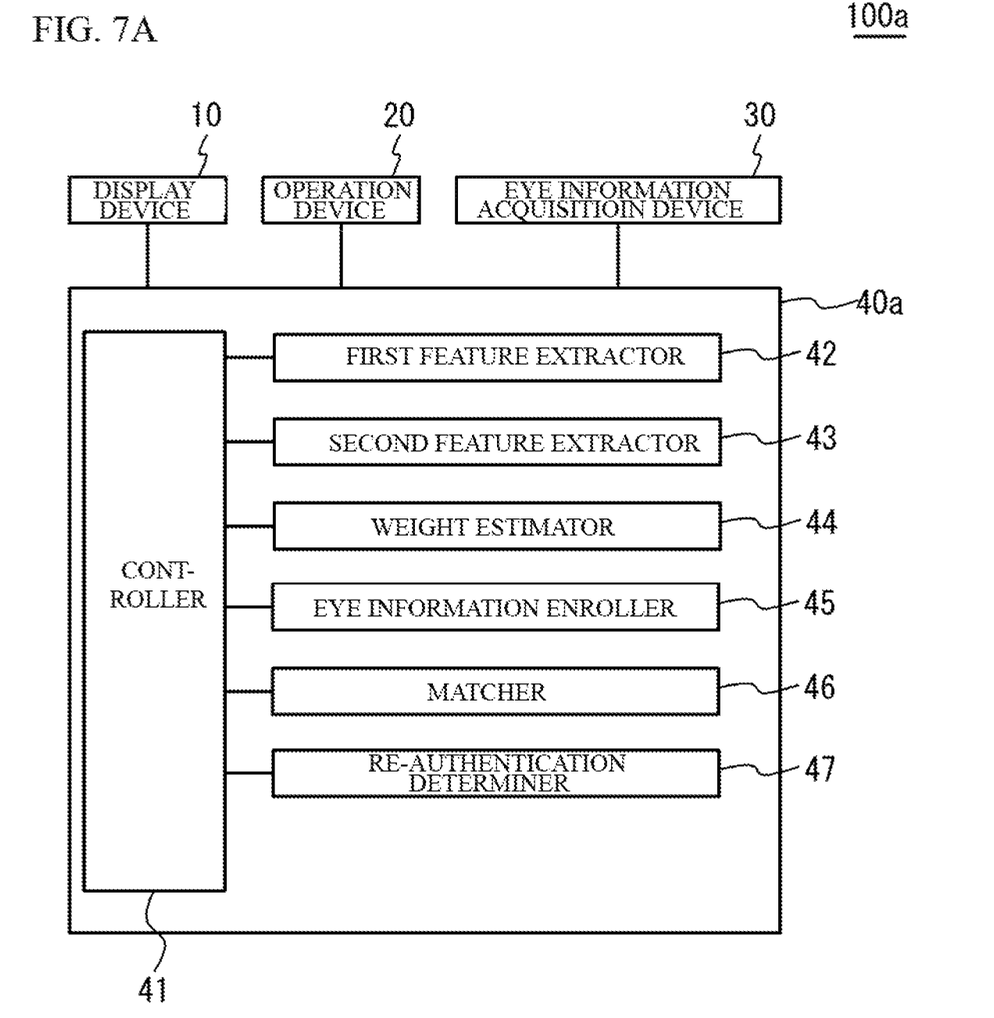
FIG. 7A illustrates an overall structure of a biometric authentication device in accordance with a second embodiment.
Figure 7B:
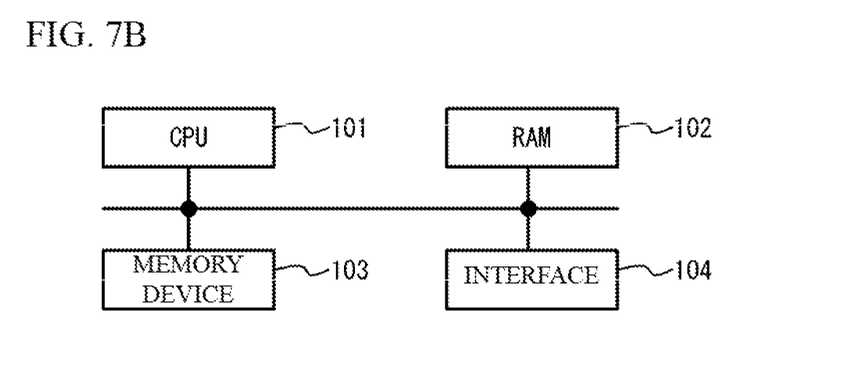
FIG. 7B illustrates a hardware structure of a process unit.
Figure 8:
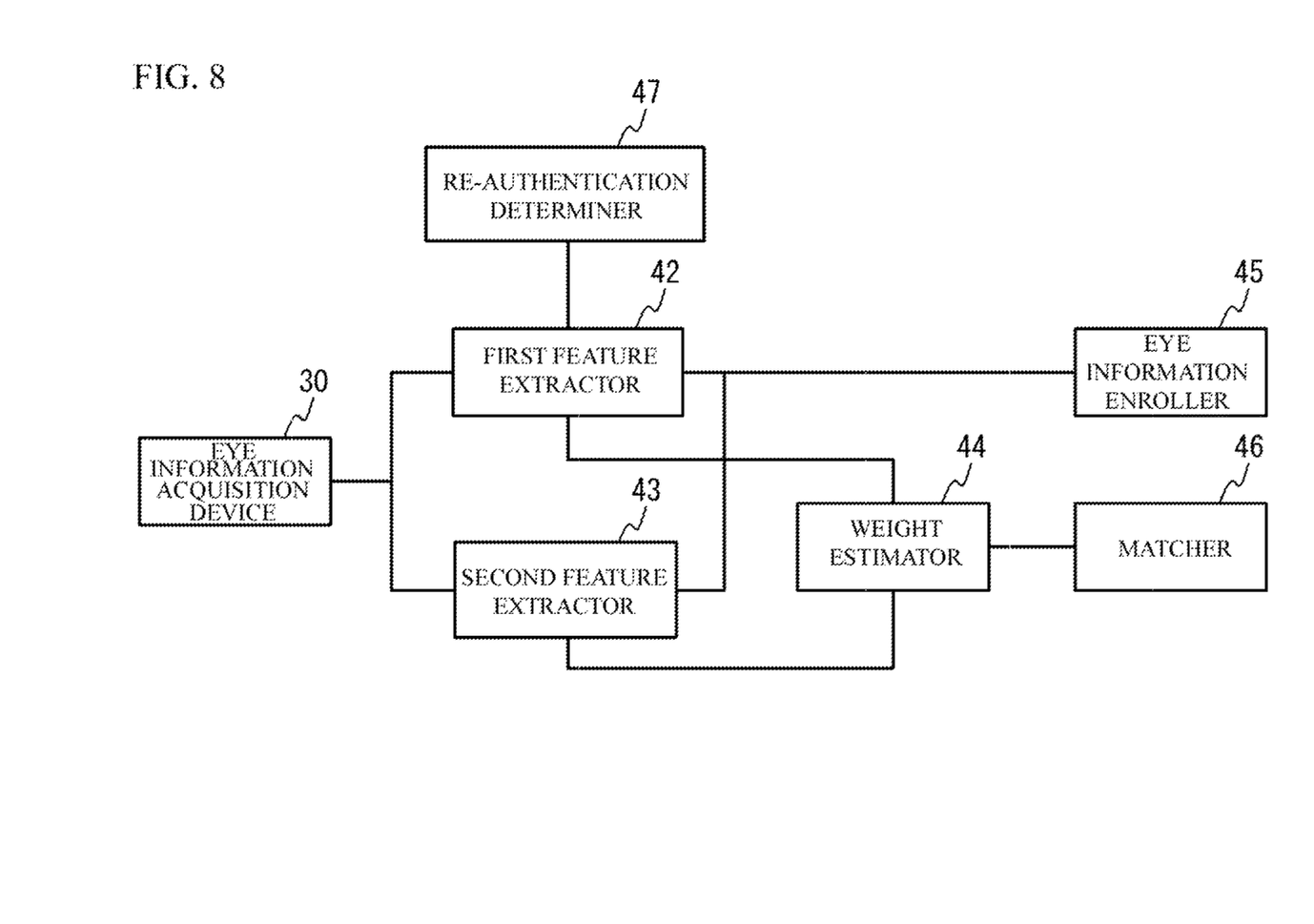
FIG. 8 illustrates a function block diagram of a continuous authentication process.

FIG. 7A illustrates an overall structure of a biometric authentication device 100a in accordance with a second embodiment. As illustrated in FIG. 7A, the biometric authentication device 100a is different from the biometric authentication device 100 in a point that a process unit 40a is provided instead of the process unit 40. The process unit 40a is different from the process unit 40 in a point that a re-authentication determiner 47 is provided. As illustrated in FIG. 7B, a hardware structure of the process unit 40a is the same as that of the process unit 40. An enrollment process and an authentication process of the biometric authentication device 100a are the same as those of the first embodiment. In the second embodiment, after the authentication is succeeded in the authentication process, a continuous authentication process for continuing the authentication at a predetermined time interval is performed. FIG. 8 illustrates a function block diagram of the continuous authentication process. A description will be given of the continuous authentication process of the second embodiment.

Figure 9:
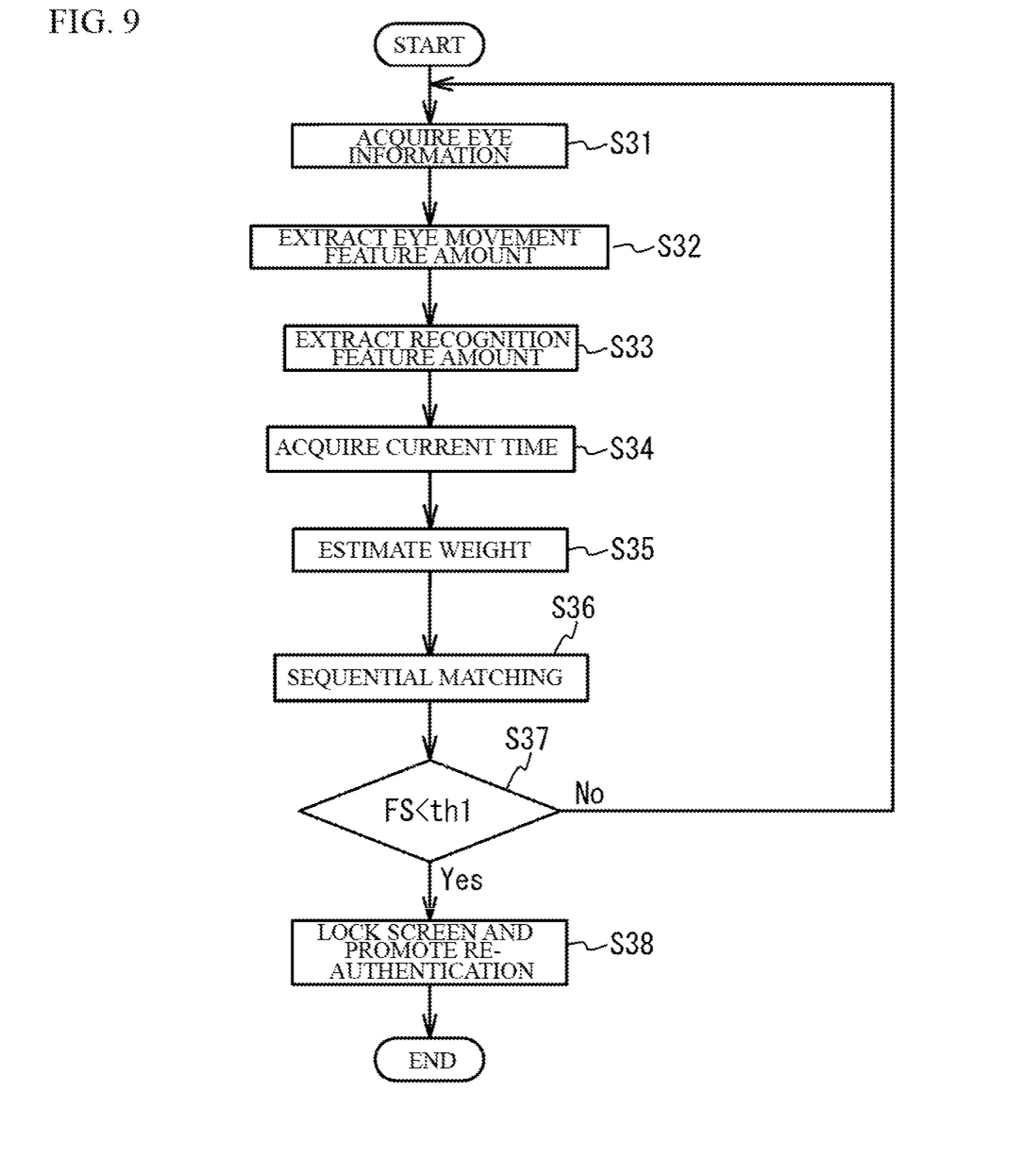
FIG. 9 illustrates a flowchart of a continuous authentication process.

(Continuous authentication process) A description will be given of the continuous authentication process based on FIG. 8 and FIG. 9. FIG. 9 illustrates a flowchart of the continuous authentication process. As illustrated in FIG. 9, Step S31 to Step S36 are the same as Step S11 to Step S16 of FIG. 4. Next, the re-authentication determiner 47 determines whether the similarity FS is less than the threshold th1 (Step S37). When it is determined as "No" in Step S37, Step S31 is executed again after a predetermined period. When it is determined as "Yes" in Step S37, the re-authentication determiner 47 locks indication of the display device 10 and indicates contents for promoting a re-authentication of a user (Step S38). After that, the execution of the flowchart is terminated.

In the embodiment, it is possible to perform the continuous authentication process without asking for a specific task from a user. When the continuous authentication is performed, it is possible to determine necessity of authentication after succeeding of authentication. Thus, security accuracy is improved. The threshold th1 of Step S37 may be different from the threshold th1 of Step S17.

Third Embodiment

Figure 10A:
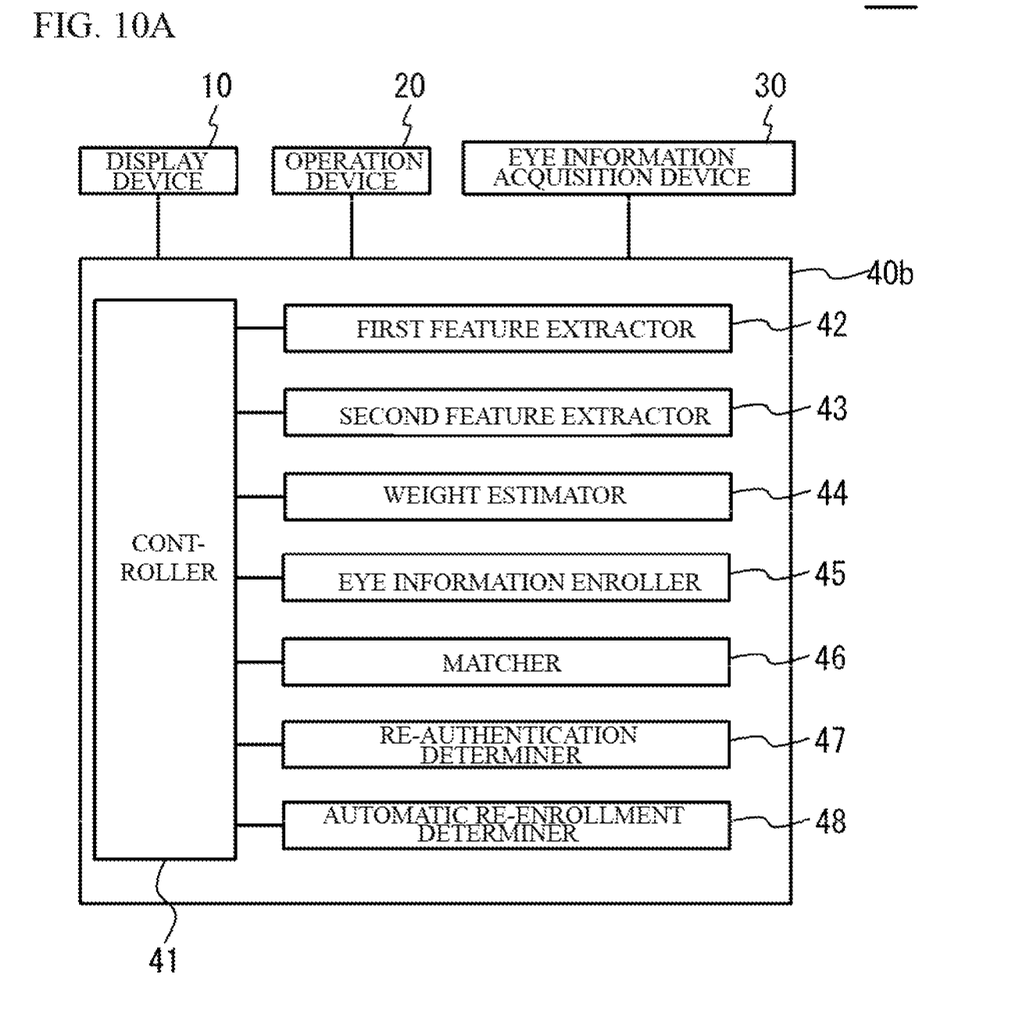
FIG. 10A illustrates an overall structure of a biometric authentication device in accordance with a third embodiment.
Figure 10B:
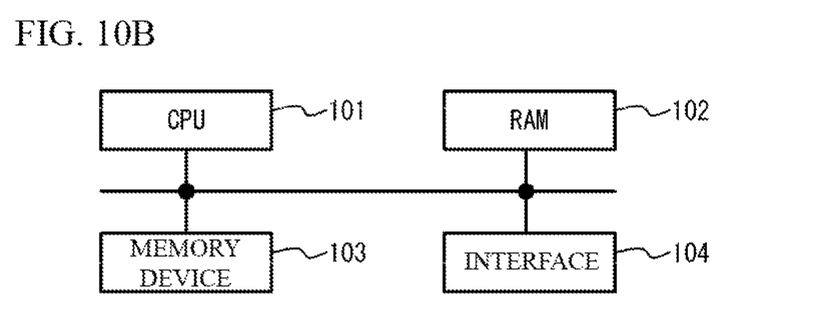
FIG. 10B illustrates a hardware structure of the process unit.
Figure 11:
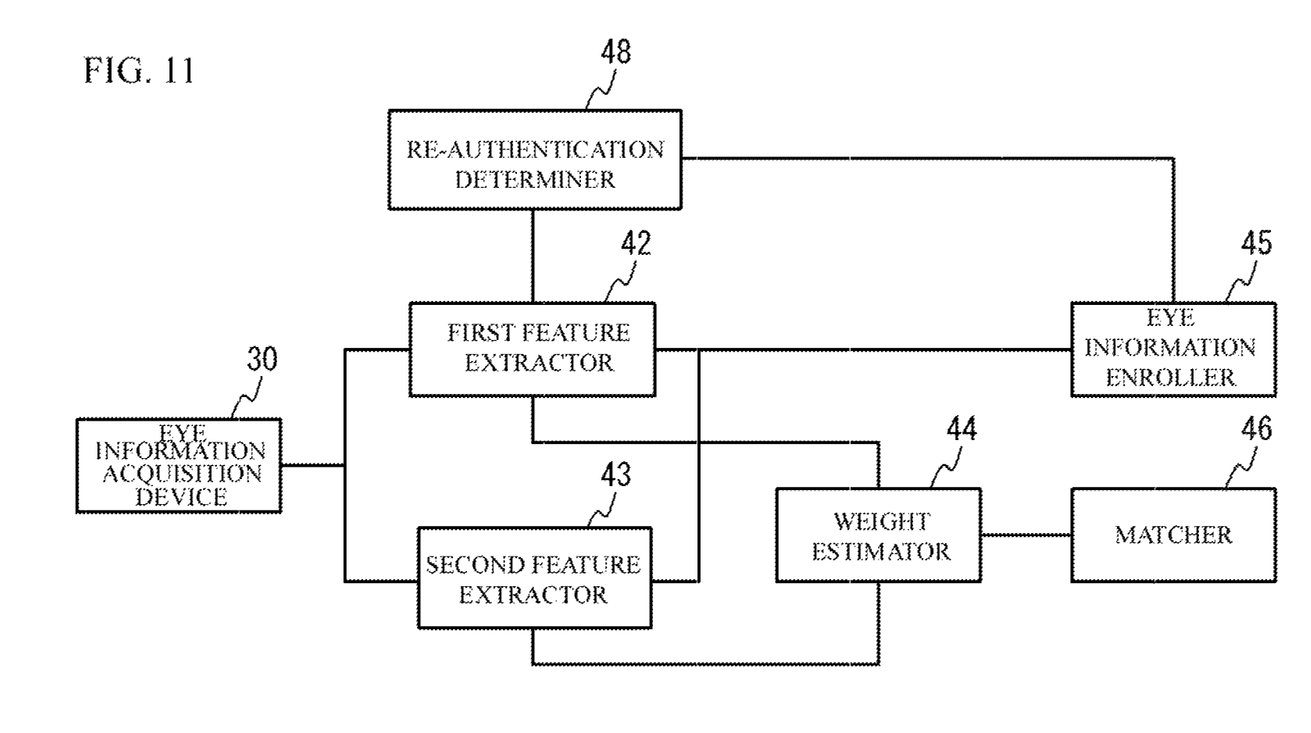
FIG. 11 illustrates a function block diagram of a continuous authentication process.

FIG. 10A illustrates an overall structure of a biometric authentication device 100b in accordance with a third embodiment. As illustrated in FIG. 10A, the biometric authentication device 100b is different from the biometric authentication device 100a of the second embodiment in a point that a process unit 40b is provided instead of the process unit 40a. The process unit 40b is different from the process unit 40a in a point that an automatic re-enrollment determiner 48 is provided. A hardware structure of the process unit 40b is the same as that of the process unit 40a. An enrollment process and an authentication process of the biometric authentication device 100b are the same as those of the first embodiment. In the third embodiment, after the authentication process is succeeded, the continuous authentication process for continuing the matching at a predetermined time interval is performed. FIG. 11 illustrates a function block diagram of the continuous authentication process. A description will be given of the continuous authentication process of the third embodiment.

Figure 12:
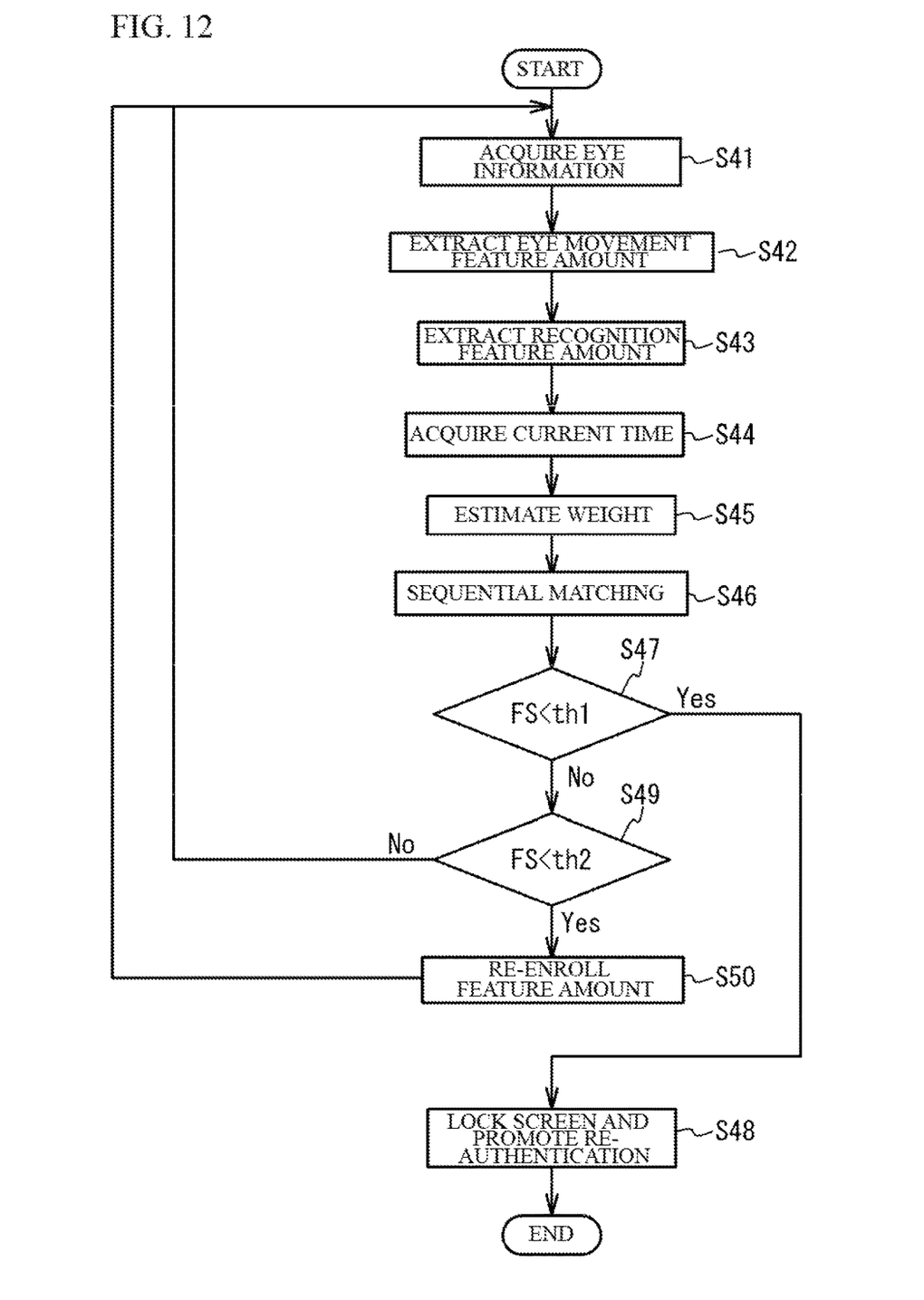
FIG. 12 illustrates a flowchart of a continuous authentication process.

(Continuous authentication process) A description will be given of the continuous authentication process based on FIG. 11 and FIG. 12. FIG. 12 illustrates a flowchart of the continuous authentication process. As illustrated in FIG. 12, Step S41 to Step S48 are the same as Step S31 to Step S38 of FIG. 9. When it is determined as "No" in Step S47, the automatic re-enrollment determiner 48 determines whether the similarity FS is less than a threshold th2 (Step S49). The threshold th2 is larger than the threshold th1.

When it is determined as "Yes" in Step S49, the recognition feature amount and the eye movement feature amount that are extracted in the continuous authentication process of the last time or the authentication process of the last time are re-enrolled in the eye information enroller 45 as the enrollment eye information (Step S50). After that, Step S41 is executed again after a predetermined time passes. When it is determined as "No" in Step S49, Step S41 is executed again after a predetermined time passes.

In the embodiment, it is possible to perform the continuous authentication process without asking for a specific task from a user. When the continuous authentication is performed, it is possible to determine necessity of authentication after succeeding of authentication. Thus, security accuracy is improved. The threshold th1 of Step S47 may be different from the threshold th1 of Step S37.

In the above-mentioned embodiments, the eye information acquisition device 30 acts as an acquisition device configured to acquire eye information of a user. The first feature extractor 42 acts as a first extractor configured to extract a first eye feature based on recognition characteristic from the eye information. The second feature extractor 43 acts as a second extractor configured to extract a second eye feature based on eye movement characteristic from the eye information. The matcher 46 acts as a matcher configured to match a first eye feature enrolled in advance with the first eye feature extracted by the first extractor, and to match a second eye feature enrolled in advance with the second eye feature extracted by the second extractor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biometric authentication device comprising:
    an acquisition device configured to acquire a rotation angle of an eyeball of a user;
    a memory; and
    a processor coupled to the memory and the processor configured to:
    extract a first eye feature based on recognition characteristic from the rotation angle;
    extract a second eye feature relating to movement performance of the eyeball from the rotation angle;
    match a first eye feature enrolled in advance with the first eye feature extracted by the first extractor, and to match a second eye feature enrolled in advance with the second eye feature extracted by the second extraction; and
    output a matching result according to a first matching result between the first eye feature enrolled in advance and the first eye feature extracted in the extracting of the first eye feature and a second matching result between the second eye feature enrolled in advance and the second eye feature extracted in the extracting of the second eye feature.

2. The biometric authentication device as claimed in claim 1, wherein the first eye feature is an eye feature relating to recognition to an object.

3. The biometric authentication device as claimed in claim 1, wherein the processor is configured to influence weights of the first matching result and the second matching result on the matching result.

4. The biometric authentication device as claimed in claim 3, wherein the processor is configured to influence an elapsed time from enrollment of the first eye feature and the second eye feature enrolled in advance on the weights.

5. The biometric authentication device as claimed in claim 4, wherein the processor is configured to reduce the weight of the second matching result in accordance with the elapsed time.

6. A biometric authentication method comprising:
    acquiring a rotation angle of an eyeball of a user;
    extracting a first eye feature based on recognition characteristic from the rotation angle;
    extracting a second eye feature relating to movement performance of the eyeball from the rotation angle;
    matching a first eye feature enrolled in advance with the first eye feature extracted in the extracting of the first eye feature;
    matching a second eye feature enrolled in advance with the second eye feature extracted in the extracting of the second eye feature; and
    outputting a matching result according to a first matching result between the first eye feature enrolled in advance and the first eye feature extracted in the extracting of the first eye feature and a second matching result between the second eye feature enrolled in advance and the second eye feature extracted in the extracting of the second eye feature.

7. The biometric authentication method as claimed in claim 6, wherein the first eye feature is an eye feature relating to recognition to an object.

8. The biometric authentication method as claimed in claim 6, further comprising:
  influencing weights of the first matching result and the second matching result on the matching result.

9. The biometric authentication method as claimed in claim 8, wherein, in the influencing, an elapsed time from enrollment of the first eye feature and the second eye feature enrolled in advance is influenced on the weights.

10. The biometric authentication method as claimed in claim 9, wherein, in the influencing, the weight of the second matching result is reduced in accordance with the elapsed time.

11. A computer readable, non-transitory medium storing a program that causes a computer to execute a process, the process comprising:
  extracting a first eye feature based on recognition characteristic from a rotation angle of an eyeball of a user acquired by an acquisition device;
  extracting a second eye feature relating to movement performance of the eyeball from the rotation angle;
  matching a first eye feature enrolled in advance with the first eye feature extracted in the extracting of the first eye feature;
  matching a second eye feature enrolled in advance with the second eye feature extracted in the extracting of the second eye feature; and
  outputting a matching result according to a first matching result between the first eye feature enrolled in advance and the first eye feature extracted in the extracting of the first eye feature and a second matching result between the second eye feature enrolled in advance and the second eye feature extracted in the extracting of the second eye feature.

12. The medium as claimed in claim 11, wherein the first eye feature is an eye feature relating to recognition to an object.

13. The medium as claimed in claim 11, wherein the process further comprises:
  influencing weights of the first matching result and the second matching result on the matching result.

14. The medium as claimed in claim 13, wherein, in the influencing, an elapsed time from enrollment of the first eye feature and the second eye feature enrolled in advance is influenced on the weights.

* * * * *